(12) United States Patent
Vangen et al.

(10) Patent No.: US 12,255,450 B2
(45) Date of Patent: Mar. 18, 2025

(54) SYSTEM FOR MONITORING A POWER DISTRIBUTION NETWORK AND METHODS OF BUILDING AND PERFORMING OPERATIONS ON SUCH SYSTEM

(71) Applicant: Comrod AS, Tau (NO)

(72) Inventors: Knut Vangen, Sandvika (NO); Jo Morten Eide, Stavanger (NO)

(73) Assignee: Comrod AS, Tau (NO)

( * ) Notice: Subject to any disclaimer, the term of this patent is extended or adjusted under 35 U.S.C. 154(b) by 405 days.

(21) Appl. No.: 17/632,406

(22) PCT Filed: Sep. 16, 2020

(86) PCT No.: PCT/NO2020/050239
§ 371 (c)(1),
(2) Date: Feb. 2, 2022

(87) PCT Pub. No.: WO2021/054841
PCT Pub. Date: Mar. 25, 2021

(65) Prior Publication Data
US 2022/0329100 A1    Oct. 13, 2022

(30) Foreign Application Priority Data
Sep. 17, 2019 (NO) .................................. 20191123

(51) Int. Cl.
*H02J 13/00* (2006.01)
(52) U.S. Cl.
CPC .. *H02J 13/00026* (2020.01); *H02J 13/00002* (2020.01); *H04Q 2209/00* (2013.01); *H04Q 2209/40* (2013.01); *H04Q 2209/80* (2013.01)
(58) Field of Classification Search
CPC ........... H04Q 2209/00; H04Q 2209/10; H04Q 2209/20; H04Q 2209/25; H04Q 2209/40;
(Continued)

(56) References Cited

U.S. PATENT DOCUMENTS 1,976,378 A    10/1934  Vrooman
2,030,491 A    2/1936   Jo
(Continued)

FOREIGN PATENT DOCUMENTS

CA    2108178       10/1992
CN    204012935     12/2014
(Continued)

OTHER PUBLICATIONS

Norwegian Search Report for NO 20191123, dated Feb. 24, 2020.
(Continued)

*Primary Examiner* — Franklin D Balseca
(74) *Attorney, Agent, or Firm* — Andrus Intellectual Property Law, LLP

(57) ABSTRACT

A system is for monitoring a power distribution network having mast constructions carrying at least one power line. The system has at least two smart modules, each being affixed to a respective mast construction and designed for wireless communication with each other for forming a main wireless communication network along the power line. The system has a sensor system affixed to a respective one of the mast constructions. The sensor system is designed for determining at least one quantity or event of the network and for communicating the quantity or event to a respective smart module, which are designed for communicating information associated with the quantity or event along the network, for being remotely monitored. The smart modules are placed outside the Live working and Vicinity zones in accordance with the EN50110-1 standard for power networks, and at least one sensor system is contained in each smart module itself.

20 Claims, 6 Drawing Sheets

(58) Field of Classification Search
CPC ........... H04Q 2209/43; H04Q 2209/70; H04Q 2209/80; H04Q 2209/82; H04Q 2209/823; H04Q 2209/826; H04Q 2209/84; H04Q 2209/845; H04Q 2209/86; H04Q 9/00; H02J 13/00026; H02J 13/00002

See application file for complete search history.

(56) References Cited

U.S. PATENT DOCUMENTS

| | | | |
|---|---|---|---|
| 3,124,712 | A | 3/1964 | Alexander |
| 4,808,917 | A | 2/1989 | Fernandes et al. |
| 4,839,567 | A | 6/1989 | Milton |
| 4,886,980 | A | 12/1989 | Fernandes |
| 6,677,743 | B1 | 1/2004 | Coolidge |
| 8,160,825 | B1 * | 4/2012 | Roe, Jr. ................ H02J 13/00 702/58 |
| 9,568,512 | B2 | 2/2017 | Divan |
| 11,006,297 | B2 * | 5/2021 | Higgins ................ H04Q 9/00 |
| 11,499,994 | B2 * | 11/2022 | Adachi ............ H02J 13/00032 |
| 2008/0024321 | A1 | 1/2008 | Polk |
| 2011/0288777 | A1 | 11/2011 | Gupta |
| 2012/0278011 | A1 | 11/2012 | Lancaster |
| 2013/0064178 | A1 | 3/2013 | Cs |
| 2015/0022376 | A1 | 1/2015 | Zhang |
| 2015/0331017 | A1 | 11/2015 | Raghunathan |
| 2016/0061862 | A1 | 3/2016 | Nulty |
| 2017/0227596 | A1 * | 8/2017 | Sozer ..................... E04H 12/00 |
| 2020/0049743 | A1 | 2/2020 | Keister |
| 2020/0072814 | A1 * | 3/2020 | Bailey ................. G01M 5/0066 |

FOREIGN PATENT DOCUMENTS

| | | |
|---|---|---|
| CN | 106786139 | 5/2017 |
| CN | 207053058 | 2/2018 |
| CN | 106992469 | 8/2018 |
| CN | 106312998 | 11/2019 |
| DE | 102020214614 B3 | 5/2021 |
| EP | 1001271 | 1/2007 |
| NO | 20191123 | 3/2021 |
| WO | 2013123055 | 8/2013 |
| WO | 2019161088 | 8/2019 |
| WO | 2019171231 | 9/2019 |
| WO | 2020021802 | 1/2020 |
| WO | 2020035179 | 2/2020 |
| WO | 2021054841 A1 | 3/2021 |

OTHER PUBLICATIONS

International Search Report and Written Opinion for PCT/NO2020/050239, dated Dec. 14, 2020.
Response to the Written Opinion for PCT/NO2020/050239, dated Jul. 6, 2021.
International Preliminary Report on Patentability for PCT/NO2020/050239, dated Aug. 16, 2021.
Search Report for Norwegian Patent Application No. 20220762, dated Dec. 5, 2022.
International Search Report and the Written Opinion for PCT/NO2023/050089, dated Sep. 4, 2023.
Response to the Written Opinion for PCT/NO2023/050089, dated Mar. 8, 2024.
Notice for PCT/NO2023/050089, dated Oct. 1, 2024.
Response to Notice for PCT/NO2023/050089, dated Oct. 14, 2024.
International Preliminary Report on Patentability for for PCT/NO2023/050089, dated Oct. 29, 2024.
Peek's Law, found online via https://en.wikipedia.org/wiki/Peek%27s_law. Date Accessed: Dec. 10, 2024.
E. Kuffel, et al., High Voltage Engineering, Fundamentals, Second Edition, Pergamon Press 1984. p. 348.
Norwegian Search Report for NO 20191411, dated Mar. 24, 2020.
International Search Report and the Written Opinion for PCT/NO2020/050290, dated Mar. 9, 2021.

* cited by examiner

SYSTEM FOR MONITORING A POWER DISTRIBUTION NETWORK AND METHODS OF BUILDING AND PERFORMING OPERATIONS ON SUCH SYSTEM

CROSS-REFERENCE TO RELATED APPLICATIONS

This application is the U.S. national stage application of International Application PCT/NO2020/050239, filed Sep. 16, 2020, which international application was published on Mar. 25, 2021, as International Publication WO 2021/054841 in the English language. The International Application claims priority of Norwegian Patent Application No. 20191123, filed Sep. 17, 2019. The international application and Norwegian application are both incorporated herein by reference, in entirety.

FIELD OF THE INVENTION

The invention relates to a system for monitoring a power distribution network, wherein the power distribution network comprises a plurality of mast constructions placed on a ground at certain distances from each other and carrying at least one power line mounted to said mast constructions. The invention further relates to methods of building such system either on a new power distribution network or on an existing power distribution network. The invention further relates to a method of performing operations on such system.

BACKGROUND OF THE INVENTION

Power distribution networks carrying powerlines on mast constructions are found all over the world. In particular where these power lines are crossing rough or difficultly accessible areas it can be challenging to monitor the state of these power lines. Personnel may have to be sent on time-consuming, difficult and even dangerous hiking missions, possibly in extreme weather, to inspect the network or fix problems like trees that have fallen on the lines, causing all kinds of problems like sparkover, breakage of powerlines, etc. In order to solve these problems and challenges monitoring systems and line sensors have been reported in the prior art to provide for remote monitoring capability of power line networks.

For example, PCT publication WO2013/123055 discloses a power line management system which collects data about power lines from multiple locations in a power distribution system. The data is aggregated and analysed to determine current conditions of power lines requiring maintenance and/or predict a time at which maintenance is likely to be required for one or more power lines. This information may be used to schedule maintenance operations and the locations at which the maintenance is to be performed. The system for detecting or predicting conditions on power lines uses multiple sensors that are attached to the power lines. Each sensor unit may contain multiple types of sensors. Processing of data collected by the sensor units includes correlating and jointly processing different types of sensor data derived from the same sensor units or different sensor units. The data from a group of sensor units are typically collected by a computing device through wireless connections, which then determines the states or events connected to the power line.

Even though the above described prior art solution provides for a way of monitoring powerlines remotely, it still suffers from severe drawbacks. A first major problem with the existing system is that it fully relies on sensors that are to be mounted to the power lines, which is a draw back in system complexity. Also such system requires live working zone installation, operation and maintenance, and also puts serious design constraints on the sensor modules themselves because of exposure to high electric, magnetic and electro-magnetic fields, constant vibration and corrosive effects of ozone from corona discharges.

In view of the above described problems there is a need to further develop power line monitoring systems.

SUMMARY OF THE INVENTION

The invention has for its object to remedy or to reduce at least one of the drawbacks of the prior art, or at least provide a useful alternative to prior art.

The object is achieved through features which are specified in the description below and in the claims that follow.

In a first aspect the invention relates to a system for monitoring a power distribution network, wherein the power distribution network comprises a plurality of mast constructions placed on a ground at certain distances from each other and carrying at least one power line mounted to said mast constructions. The system further comprises at least two smart modules, each smart module being affixed directly to a respective one of the plurality of mast constructions. The at least two smart modules are further designed for wireless communication with each other in accordance with a wireless communication protocol for forming a main wireless communication network along the power line. The system further comprises at least one sensor system affixed directly to a respective one of said mast constructions, the at least one sensor system being designed for determining at least one quantity or event of the power distribution network and for communicating said at least one quantity or event to a respective smart module. The at least one sensor system is further coupled to the smart module. In addition, the at least two smart modules are designed for communicating information associated with said at least one quantity or event along the main wireless communication network of smart modules for being remotely monitored, for instance at a data centre. The at least two smart modules are placed outside the Live working and Vicinity zones in accordance with the EN50110-1 standard for power networks. At least one of the at least one sensor system is contained in each smart module itself.

The effects of the features of the system in accordance with the invention are as follows. First of all, a key feature of the system is that the smart modules are affixed directly to the mast constructions, wherein each smart module is designed for wireless communication with other smart modules that are affixed to other mast constructions. This feature enables the building of a very regular grid of wireless network nodes along the power line forming a main wireless communication network using a wireless communication protocol. Furthermore, at least one mast construction (but preferably more or even all) are provided with a sensor system affixed directly to it, wherein the sensor system is designed for determining at least one quantity or event of the power distribution network (the power line, the mast construction or both) and for communicating same to the smart module (of which it also may physically form part in some embodiments), which smart module in its turn may communicate same further to other smart modules. Another key feature of the invention is that at least a (primary) sensor system is affixed directly to the mast construction and not to the powerline or otherwise inside the Live working or Vicinity zones as is known from the prior art. It is the insight of the inventors that many quantities and events can actually be sensed on or in the mast construction itself, and even outside the Live working and Vicinity zones. For instance, a tree falling on the power lines will cause vibrations in both the power lines and the mast constructions. Placing the smart modules and sensor systems on the mast constructions provides for significant advantages. It is much easier to affix modules and units on the mast construction than on the power line, avoiding live work processes ("AUS") or dead power line by disconnection. In addition, it is much easier to autonomously provide and store energy to said modules and units when they are affixed directly to the mast construction with less constraints on weight and volume. In the prior art line sensors are often powered by the live power lines themselves through energy harvesting techniques. The problem with this, however, is that if the power line is dead no power is provided to the line sensors. In order to solve these problems, energy storage like batteries may be added, but these are often bulky and heavy with limited lifetime, which makes the design, operation and maintenance of line sensors an even greater challenge. This is exactly the reason why the invention is so advantageous as bulkiness and heaviness of battery packs and solar cell panels no longer is a serious constraint for design, installation, operation, and maintenance. Also, communication between the sensor systems and the smart modules becomes much easier when they are affixed directly to the mast construction and partly or fully integrated with the smart module. Explained more elaborately, one major design challenge in a sensor system that is located very close to or even mounted directly on the power line, is the antenna part, i.e. it is very difficult to obtain a high antenna gain for long range communication to next network node close to and in the directions parallel to the power line. In addition, the strong stationary and transient magnetic and electric fields are disadvantageous for the physically larger high gain antennas and transceivers. Also, the power line itself is a conductor and behaves as ground plane for the antenna, even at 2.4 GHz frequencies. All this makes the design of long range antennas on the line sensors very challenging. These challenges are strongly reduced when the respective functionality is placed on the mast construction, outside Live working and Vicinity zones, further away and better protected from the fields around the power lines.

In general, it is desired to place as much functionality as possible outside the "Live working zone" or "Vicinity zone" at respective distances DL or DV from the high voltage parts of power lines, with typical DV range of 1.2-3.0 meters for regional power networks in accordance with the directive in the EN50110-1 standard for power networks. As far as any part of a sensor systems in accordance with the invention is to be placed inside the Live working or Vicinity zones, it may require use of Live-line or Vicinity work processes (Norwegian: "Arbeid Under Spenning (AUS)") or that the power lines are "dead"—switched off.

At the mast construction, vertically oriented antennas with high gain in vertical plane and omnidirectional in horizontal plane allows optimum connection to adjacent network nodes and also high resistance to weather and lightning strikes. This is well known experience from outdoor antenna applications as different as marine, military and cellular base stations. Masts of composite or wood are even semi-transparent to RF signals allowing omnidirectional signals with low distortion of antenna beam. Thus, the system in accordance with the invention provides for a more robust system, which is less complex, offers greater functionality and flexibility, is easier to install, operate and maintain and provides for a convenient long-range communication network along the power line.

At least one sensor system is contained in the smart modules, placed outside Live working and Vicinity zones from the high voltage parts of power lines in accordance with the directive in the EN50110-1 standard for power networks. The advantage of this is that more intelligence and smart functions are contained in a single housing and therefore the system is easy to mount. Additionally, it is the insight of the invention that some quantities and events may be easily sensed or determined by an apparatus that is affixed to the mast construction, thereby giving power distribution monitoring functionality without even the need for line sensors as have been reported in the prior art.

Transient sensors closely integrated with the smart module also allows for a precise, common time-base, allowing smart time correlation of different sensor detections of events.

In order to facilitate understanding of the invention one or more expressions are further defined hereinafter.

The wording "sensor system" must be interpreted as one device or a plurality of cooperating devices which are designed for sensing or measuring directly or indirectly a quantity or event of the power line.

The wording "at least one quantity or event" must be interpreted as including everything that may be of relevance for the state of the power distribution network. Example of quantities or events which may be directly determined are:
  acceleration (shock) and/or vibration and/or inclination of the mast construction;
  tension or compression in the mast construction (because of bending);
  sensing sparkover between power lines and/or between a power line and ground;
  current running through the power line;
  temperature of the power line;
  local weather conditions, including wind speed, ambient temperature, solar heating, humidity and precipitation;
  Manufacturing and maintenance data of the mast construction and power line (which may be stored in RFID tags integrated in the mast elements or in the system itself);
  Current in the (ground-)down-conductor from the crossbar to earth, and
  images and videos of the power line and mast construction.

Example of quantities or events which may be indirectly determined are:
  acceleration and/or vibration of the power line, wherein the acceleration and/or vibration is transferred over to the mast construction (vibration spectra may be recognized as the (very low) resonant frequencies of the power lines, transferred via isolators and crossbar to the mast construction, all with different and higher resonant frequencies). The line suspensions are also the dominant force and mass to the mast structure.
  Acceleration patterns or changes in inclination recognized as trees or other objects falling or leaning on or touching lines, such as:
  trees or branches on the power line;
  powerline sag, and
  snow or ice on the power line.

The wording "affixed directly to the mast construction" must be interpreted as creating a physical connection between the respective object and the mast construction or embedding in a part of the mast construction, as long as the connection is not via the power line. Yet, there may be supports, arms, brackets, screws, and the like between the object and the mast construction.

The wording "wireless communication protocol" must be interpreted as protocols such as WIFI (IEEE802.11 family), Bluetooth (IEEE 802.15.1), Mesh RF like IEEE802.15.4, 4G LPWAN's like LTE-M or NB-IoT, etc.

In an embodiment of the system according to the invention said smart modules form a wireless mesh network (WMN). Wireless mesh networks are typically self-configuring and self-healing. The great advantage of this type of wireless network is the robust and autonomous reconfiguration allowing for node hopping or skipping. This will be further elaborated upon in view of some further embodiments.

In an embodiment of the system according to the invention said smart modules are placed at such locations and at such distances relative to each other that at least a subset of said smart modules are capable of skipping one or more smart modules to communicate directly with a first-following node thereafter. The long range required to skip multiple nodes at masts along a power line, requires high RF power, good RF sensitivity and high gain antennas, none of which is easily implemented in a standalone powerline mounted sensor. This embodiment is particularly advantageous in hilly terrains, where some of the mast constructions are located on a hilltop and effectively have line-of-sight to multiple mast constructions along a neighbouring valley and even the next hilltop. If for whatever reason one of the nodes (smart modules) in the wireless network fails, the wireless mesh protocol conveniently allows for communication with a further located node as long as the line-of-sight distance does not exceed the capabilities of the transceiver and antenna system.

In an embodiment of the system according to the invention the at least one sensor system is designed for sensing at least acceleration and/or vibration of the respective mast construction to which it is mounted. These quantities may be conveniently sensed and may give an indirect indication of problems with the power lines, such as trees and branches falling on them. It must be mentioned that acceleration and vibration are related quantities. Vibration always implies acceleration and therefore may be detected with an accelerometer. In fact, instantaneous acceleration can be measured by a single measurement, while vibration frequency and amplitude can be analysed from a series of acceleration measurements (samples).

In an embodiment of the system according to the invention at least one of the at least one sensor system is mounted directly to the mast construction itself outside the smart module. This embodiment gives the possibility of a large group of alternatives. For example, when the sensor system is mounted directly on the mast or on the crossbars it is possible to determine stretching and contraction of the respective parts (using tension or compression sensors).

In an embodiment of the system according to the invention the at least one sensor system is designed i) for measuring tension and/or compression of a part of the respective mast construction to which it is mounted and/or ii) for sensing at least acceleration and/or vibration of the respective mast construction to which it is mounted and/or iii) for sensing presence and location of sparkover between power lines and/or between a respective power line and ground, and/or for iv) sensing or measuring the temperature of the power line and/or for v) measuring the ground-conductor current. The technique of detection and localising by time-of-arrival of sparkover using sensors dedicated to that purpose is disclosed in EP1001271 for example.

In an embodiment of the system according to the invention each pair of a respective sensor system and a respective smart module is designed for wireless communication with each other using a further wireless communication protocol for forming a local wireless communication network in between said sensor system and said smart module, wherein this local wireless communication network is different from the main wireless mesh communication network, preferably with low power and short range for allowing multiple local nodes and spectrum re-use between smart modules of neighbouring mast constructions. The advantage of this embodiment is that the main wireless communication network and the local wireless communication network can each be configured and tuned for their own roles. Expressed more precisely, the main wireless communication network may be configured and tuned for the long-distance communication of the information associated with the detected quantities and events, whereas the local wireless communication network may be configured and tuned for the (local, short-range) communication of the information related to the detected or sensed quantities or events by the respective sensor system, which happens over relatively short distances, at least not more than the distance between neighbouring construction masts. The local wireless communication network can have a higher transmission speed as the distance is short, while protocol overhead is low and there are few nodes in a predictable master-slave network, where no collision or arbitration is needed. A great advantage of the higher speed is that the respective transceivers can have a very low duty cycle (mostly sleeping) and very low RF transmitter power, which is impossible in the longer range main wireless mesh communication network, wherein every transceiver has to be constantly receiving and frequently transmitting messages along the line. This allows very low power consumption in the short range, low duty-cycle radio-based sensors, allowing simple energy harvesting and battery free energy backup by capacitors only.

In an embodiment of the system according to the invention the at least one sensor system comprises a camera for visual or thermal inspection of the power distribution network including the mast construction and power line, and wherein the smart modules are designed for communicating visual inspection data along the main wireless communication network. Visual inspection of the power distribution network greatly increases the possibility of monitoring the system in that it may give direct information that something is wrong, for instance when a tree has fallen on the powerline or mast construction. Thermal inspection using a thermal imaging camera or infrared long-distance sensors gives the possibility to detect problems in the power lines in a very early stage.

In an embodiment of the system according to the invention the at least one sensor system comprises a sparkover sensor which is designed for sensing sparkover between power lines or between a respective power line and ground and determining a distance between said sparkover sensors and the sparkover location on the power line, for instance by measuring RF wireless time of arrival using a time reference like GPS. The technique of detection of sparkover using wired sensors dedicated to that purpose is disclosed in EP1001271 for example.

In an embodiment of the system according to the invention the at least one sensor system comprises at least one current sensor for sensing a current through the power line. Current sensors as such are well known from the prior art. Adding a current sensor to the sensor system increases the options to get information about the state of the power line.

For example, when a power line breaks, the current through the line may become zero. Or, when a tree falls on the power line the current may become very large or at least change.

An embodiment of the system according to the invention further comprises at least one line sensor mounted to the power line, wherein said line sensor and respective smart module are designed for wireless communication with each other using a further wireless communication protocol for forming a further local wireless communication network in between them, wherein the further local wireless communication network is different from the main wireless communication network. The protocol of the further local wireless communication network may be the same as that of the other local wireless communication network, or it may be a different protocol. In any case both local wireless communication networks only require communicating over short distances, at least not more than the distance between neighbouring construction masts.

In an embodiment of the system according to the invention the at least one line sensor is designed for sensing at least one of the following quantities: vibration of the respective power line, inclination of the power line, compression and/or contraction of the power line, power line temperature, voltage from phase to ground, the current running through the power line and presence and location of sparkover between power lines and/or between a respective power line and ground. Even though the main gist of the invention is to provide intelligence or smartness into a smart module directly affixed to the mast construction, the level of intelligence or smartness may still be supplemented by using line sensors. Line sensors for sensing quantities and events on a powerline as such are well-known from the prior art and may be conveniently added to the system for monitoring the power distribution network.

In an embodiment of the system according to the invention at least one of the mast constructions is provided with a weather station for determining the weather, wherein said weather station is coupled to the respective smart module, and wherein said smart modules are designed for communicating weather data along the main wireless communication network. Weather conditions, such as wind, snow and high temperature, may be very important in determining potential risks for the power distribution systems.

In a second aspect the invention relates to a method of building the disclosed system. The method comprises steps of:
- affixing said smart modules to the respective mast constructions outside the Live work or Vicinity zones in accordance with the EN50110-1 standard for power networks;
- optionally affixing a further one of the at least one sensor system directly to the respective mast construction, preferably outside said Live working and Vicinity zones in accordance with said standard, in as far as these are located outside the smart module;
- optionally mounting the respective cameras to the mast construction, preferably outside said Live working and Vicinity zones;
- optionally mounting the at least one line sensor to the power line. The invention may be conveniently applied when building such system either on a new power distribution network or on an existing power distribution network.

In a further aspect the invention relates to a method of performing operations on the disclosed system. The method comprises at least one of the following steps:

- operating a respective smart module at the respective mast constructions outside the Live working and Vicinity zones in accordance with the EN50110-1 standard for power networks;
- performing maintenance on a respective smart module located outside the Live working and Vicinity zones in accordance with the EN50110-1 standard for power networks, and
- removing a respective smart module located outside the Live working and Vicinity zones in accordance with the EN50110-1 standard for power networks.

BRIEF INTRODUCTION OF THE FIGURES

In the following is described an example of an embodiment illustrated in the accompanying figures, wherein.

DETAILED DESCRIPTION OF THE EMBODIMENTS

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present subject matter will now be described with reference to the attached figures. Various systems, structures and devices are schematically depicted in the figures for purposes of explanation only and to not obscure the present disclosure with details that are well known to those skilled in the art. Nevertheless, the attached figures are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The invention will be discussed for power distribution networks in more detail with reference to the figures. The figures will be mainly discussed in as far as they differ from previous figures.

Figure 1:
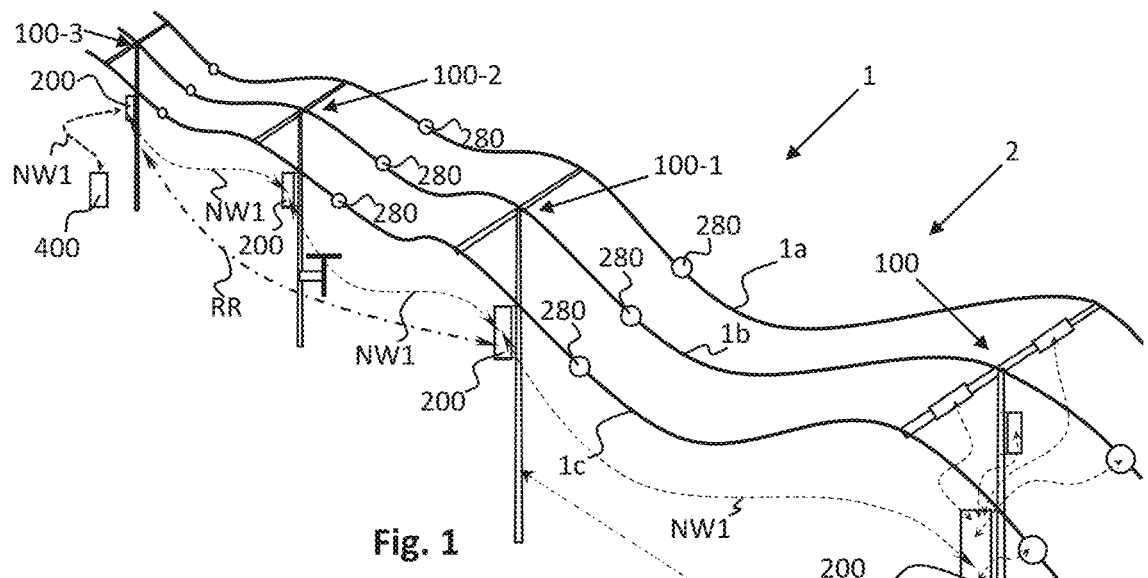
FIG. 1 shows a system for monitoring a power distribution network in accordance with a first embodiment.
Figure 2:
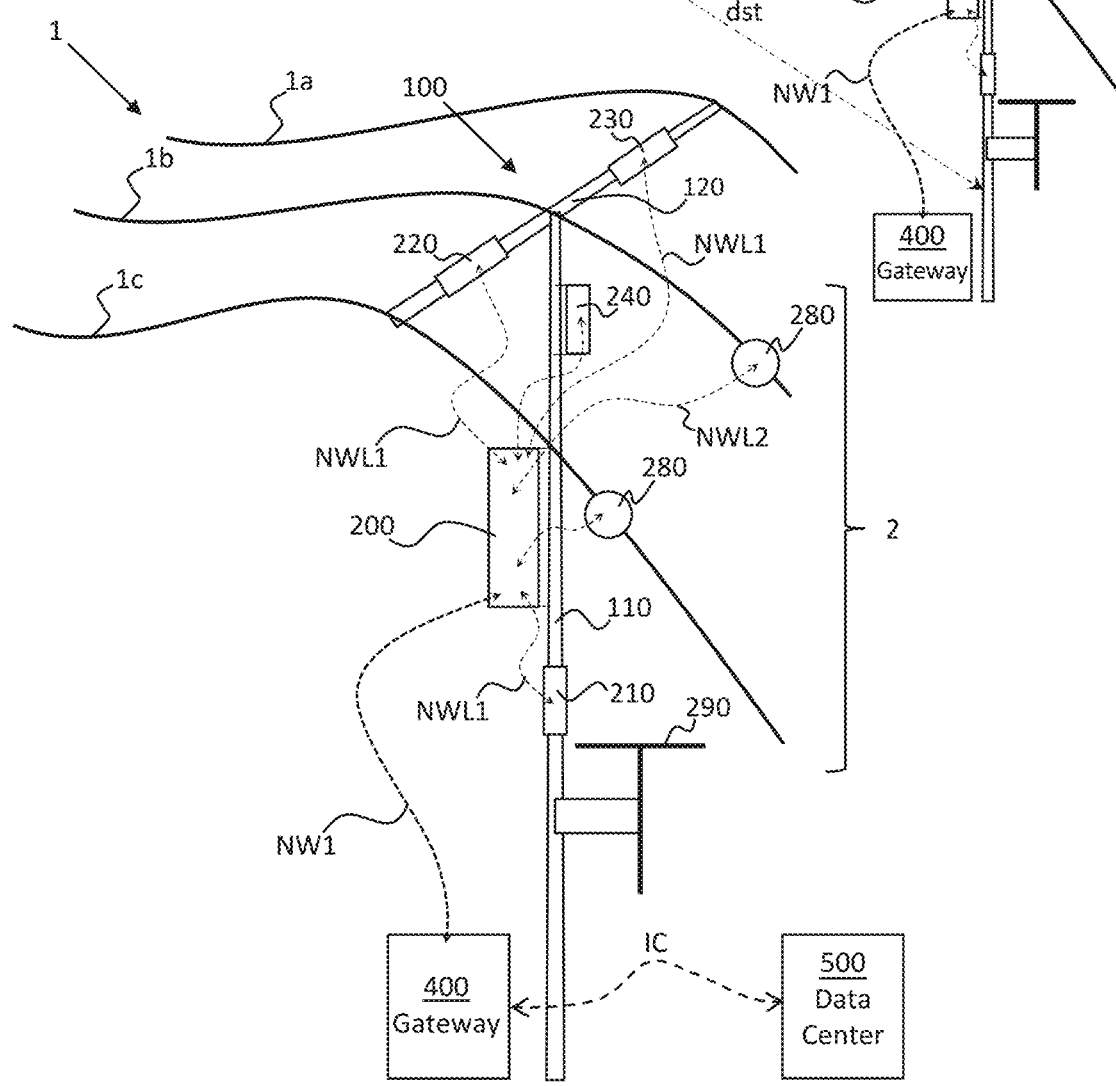
FIG. 2 shows an enlarged view of part of the system of FIG. 1.

FIG. 1 shows a system 2 for monitoring a power distribution network 1 in accordance with a first embodiment. FIG. 2 shows an enlarged view of part of the system of FIG. 1. The power distribution network 1 comprises a plurality of mast constructions 100, 100-1, 100-2, 100-3, which are placed at certain distances dst from each other. For the sake of simplicity, the topology of the environment has not been drawn. In practice however, the power distribution network 1 may cross rough or difficultly accessible areas, including mountains, forests and hills. It is particularly in such areas that the invention is useful, as will be explained further with reference to the figures. The plurality of mast constructions 100, 100-1, 100-2, 100-3 carry three power lines (phase conductors) 1a, 1b, 1c in this example embodiment, but it could be more than three in practise. The power lines 1a, 1b, 1c are typically suspended in crossbars 120 through isolators (not shown). Such isolators are well-known in the field of power distribution networks and are therefore not further discussed. The crossbars 120 are each connected to a respective mast 110 as illustrated. In the current example there is only one crossbar 120 per mast 110, but there may also be more than one crossbar or even no crossbar 120 at all (in case there is only one power line for example). The number of crossbars 120 depends on the amount of power lines 1a, 1b, 1c that are to be distributed. There is a huge variety of mast constructions known from the prior art. The invention is applicable to any kind of mast construction.

A core feature of the invention is that smart modules 200 are affixed directly to the mast constructions 100 as FIG. 2 clearly illustrates. It may be one smart module per mast construction 100 as in FIG. 1 or some mast constructions may be skipped. It is the inventor's insight that, while it is known to provide for monitoring intelligence in line sensors that are mounted directly on the power lines, this monitoring can, to a great extent, be performed from a monitoring system 2 that is affixed directly on the mast construction 100 and outside the Live working and Vicinity zones according to EN50110-1. This relatively simple measure greatly reduces the challenges and lifecycle cost that come along with providing said system only on the power lines and/or inside said zones. This is discussed in detail in the introduction of this specification. The smart module 200 forms a main ingredient of the monitoring system 2 in accordance with the invention. As will be elaborated upon later the smart module 200 may contain computation power, energy supply, memory, but also sensors, because many of the quantities or events of the power distribution network 1 may be directly determined at or in the mast construction 100.

A first main function of the smart module 200 is to create a main long-range wireless communication network NW1 along the power lines 1a, 1b, 1c, i.e. each smart module 200 may communicate with another smart module 200 along the path of the power lines as the dashed arrows illustrate. In an embodiment the main wireless communication network NW1 forms a wireless mesh network, i.e. mesh WIFI. The distance dst between and placement of said construction masts 100 is such that there is "redundancy" built-in in that respective smart modules 200 may also reach non-neighbouring smart modules, i.e. hop over one or more smart modules. This node hopping or rerouting is illustrated by a dash-dot arrow RR. The smart modules 200 may also communicate with data concentrators or gateways 400 as FIGS. 1 and 4. illustrate. The long-range also minimises the number of hops in the network, optimising performance. These gateways 400, which may be located along the power line or at a distance due to said long-range of NW1, allow for connection to the internet, which may be wired or wireless. FIG. 2 illustrates that the gateways ensure connection between the smart modules 200 and a data centre 500. Between the gateway 400 and the data centre 500 the internet connection IC is symbolically illustrated by a dashed arrow.

A second main function of the smart module 200 is connecting with a sensor system 210, 220, 230, 240, which is configured for determining at least one quantity or event of the power distribution network 1. This sensor system may be comprised in a same housing of the smart module 200 or it may have its own housing and be affixed to another part of the mast construction 100. In the embodiment of FIG. 2 there is mounted a first sensor system 210 directly on the mast 110 of the mast construction 100. The first sensor system 210 may comprise a tension or compression sensor for example, which is configured for determining bending of the mast 110, for example because of a tree or the wind. Alternatively, the first sensor system 210 may comprise an acceleration sensor for determining inclination, acceleration or vibrations of the mast construction, sparkover (RF transient) sensors, down-conductor current sensor and other sensors.

A third main function of the smart module 200 is to communicate information associated with said at least one quantity or event along the main wireless communication network NW1. Information associated with said at least one quantity or event may be obtained by processing the determined quantity or event inside the smart module, which may comprise parts like a processor unit, memory and energy management unit. This may also include data storage, concentration, consolidation, compression, and correlation of all local data to control and optimise the traffic in the network. The whole purpose of the monitoring system 2 in accordance with the invention is to get the relevant information to the data centre, which is remote from the power distribution network 1. Based upon this information the necessary actions may be initiated, such as maintenance or repair operations in the power distribution network 1.

In the embodiment of FIG. 2 there is mounted a second sensor system 220 and a third sensor system 230 directly on the crossbar 120 of the mast construction 100. Just like the first sensor system 210 these sensors systems 220, 230 may comprise a tension or compression sensor for example, which is configured for determining bending of the crossbar 120, for example because of a tree or the wind. Alternatively, these sensor systems 220, 230 may comprise an acceleration sensor for determining inclination, acceleration, or vibrations of the crossbar 120. The sensor systems 220, 230 may also be mounted between the isolators (not shown) and the power lines 1a, 1b, 1c. Alternatively, the sensor systems 220, 230 may be mounted on/at the attachment points of the isolators (not shown) to the cross-bar 120. In such cases these sensor systems 220, 230 may comprise inclination, acceleration or vibration sensors, compression or tension sensors, but also temperature sensors.

In the embodiment of FIG. 2 there is mounted a fourth sensor system 240 directly on the mast 110 yet here a bit closer to the power lines 1a, 1b, 1c, but still outside the Live working and Vicinity zones according to EN50110-1. The fourth sensor system 240 may comprise a sparkover sensor as earlier discussed. As is known from the prior art, multiple sparkover sensors 240 may cooperate by precise time tagging of events and time-of-arrival analysis to determine the location of a sparkover between powerlines 1a, 1b, 1c or between a respective powerline and ground. Alternatively or additionally, the further sensor system 240 may comprise a camera for optical inspection of the power distribution network 1 including the power lines 1a, 1b, 1c. The sensors may also be integrated in smart module 200 for lowest cost by common power supply, simple communication and common time base.

Even though the core idea of the invention is to provide "intelligence" or "smartness" directly on the mast construction 100, the monitoring system 2 of the invention may in some embodiments still be supplemented with line sensors 280 as illustrated, i.e. line sensors are not necessarily excluded. These line sensors 280 may be configured with further sensors, such as current sensors, temperature sensors, acceleration or vibration sensors, inclination sensors, compression or tension sensors, or sparkover sensors. These line sensors 280 may be very complex devices, which are hanged on or suspended on the power lines 1a, 1b, 1c, or they are mounted directly on an insulator that is fixed to the power line 1a, 1b, 1c. Nevertheless, the insight of the invention is that many of these sensors may be affixed directly to the mast construction 100 and outside the Live working and Vicinity zones as it will be easier to implement in a robust and convenient way.

In the embodiment of FIGS. 1 and 2 some of the mast constructions 100, 100-2 have been provided with a weather station 290 connected to the smart module 200 (connection not shown, may be wired or wireless), which is symbolically illustrated with a T-shape. The weather station 290 is preferably placed below and shielded by the smart module on the mast constructions 100, 100-2 because of the risk of being hit by lightning or ice and snow fall from structure above.

The embodiment of FIG. 2 also illustrates that the connections between said smart module 200 and the sensors 210, 220, 230, 240, 280 and weather station 290 is formed by one or more local wireless communication networks NWL1, NWL2. Alternatively, these connections may be wired.

It must be noted that the monitoring system 2 in accordance with the invention may comprise:
- the smart modules 2 on the mast constructions (including at least one sensor system);
- the sensor systems 210, 220, 230, 240 on the mast constructions (if present);
- the line sensors 280 on the power lines 1a, 1b, 1c (if present);
- the weather stations 290 (if present).

Figure 3:
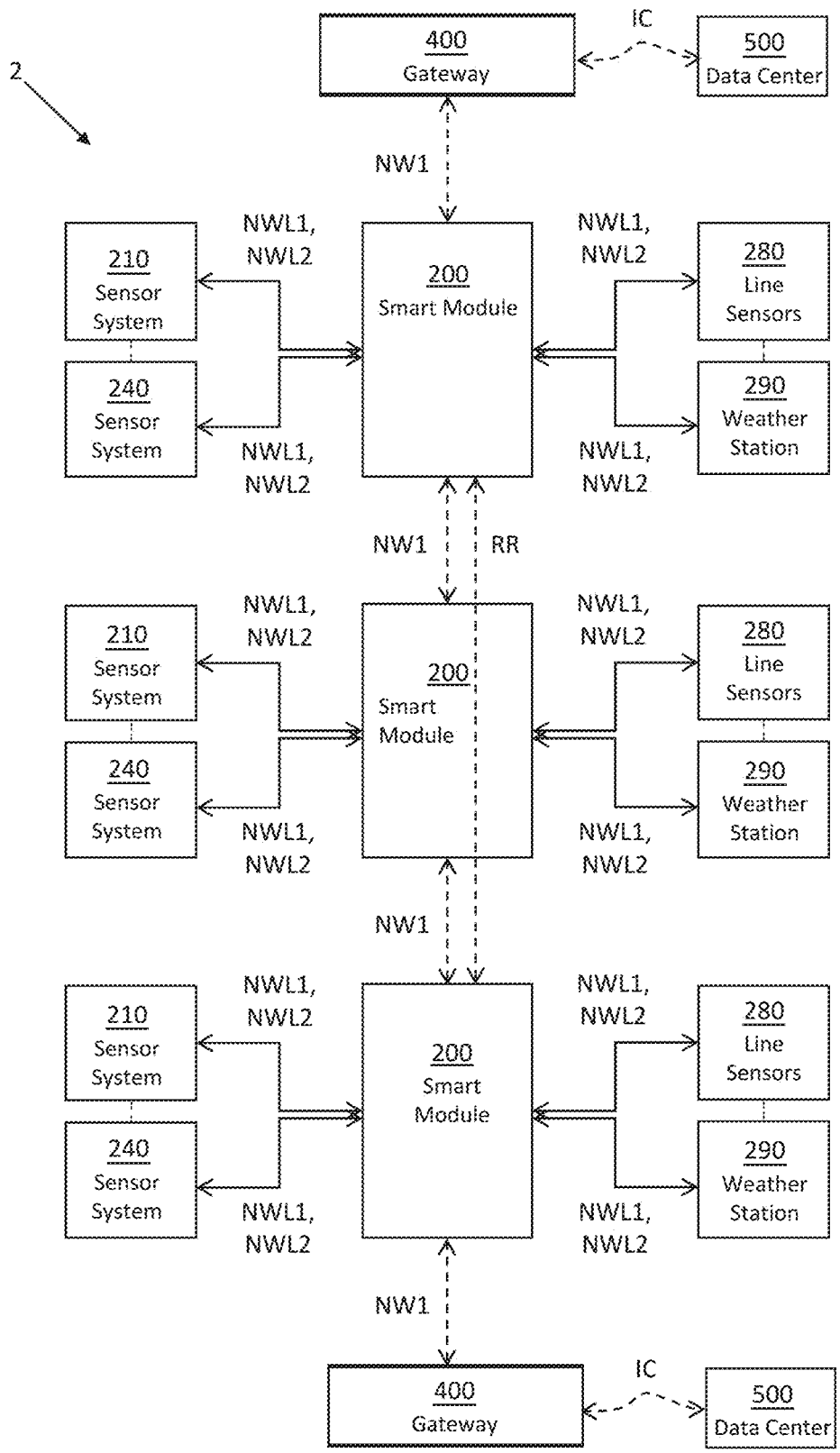
FIG. 3 illustrates how the wireless communication of the system of FIG. 1 is structured.

FIG. 3 illustrates how the wireless communication of the system of FIG. 1 is structured. The figure show the earlier mentioned gateways 400, data centre 500, internet connection IC between gateway and data centre 500 and the main wireless communication network NW1 formed by the smart modules 200. FIG. 3 also illustrates the possibility of one or more smart modules 200 being by-passed, for instance when it stopped functioning. In the example embodiment the communication between the upper and lower smart module 200 is established through a rerouting RR as illustrated. Another aspect illustrated by FIG. 3 is that the communication between the smart modules 200 and the respective sensors 210, 220, 230, 240, 280 and weather station 290 is done through at least one local wireless communication network NWL1, NWL2. Here two local communication networks NWL1, NWL2 are drawn, but there may also be just one or more than two. The primary advantage of this configuration of dual layer wireless communication networks is that each wireless communication network can be designed for its own specific purpose. The main wireless communication network NW1 is for long-distance communication, while the local wireless communication networks NWL1, NWL2 are for relatively short distances. Short distance and short range allows for frequency-reuse similar to micro-cells of cellular base stations, in this case the same band may be re-used at adjacent smart modules without interference. The local networks NWL1 and NWL2 may also have a high number of local nodes, for example one line sensor per phase conductor without slowing down NW1 mesh network by multiple long-range nodes at short internal distance. It must also be kept in mind that the design of a long-distance wireless communication network using only transceivers in line sensors 280 leads to major challenges already because of the proximity of the power lines 1a, 1b, 1 c. Therefore, in the current invention only short-distance local wireless communication is done between said line sensors 280 and the smart modules 200, which is much easier to realise.

Figure 4:
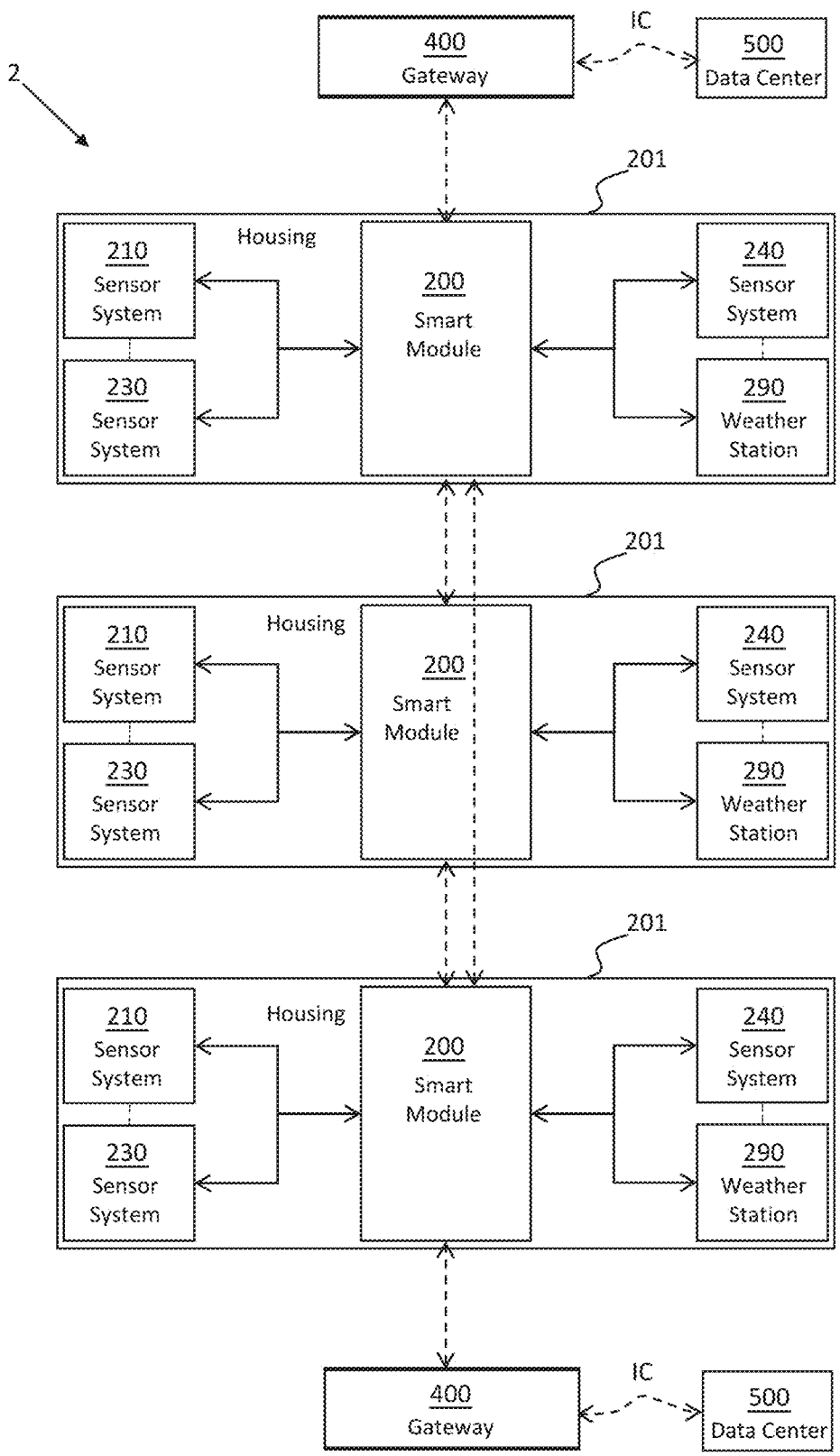
FIG. 4 shows a possible embodiment of the monitoring system in accordance with the invention.
Figure 5:
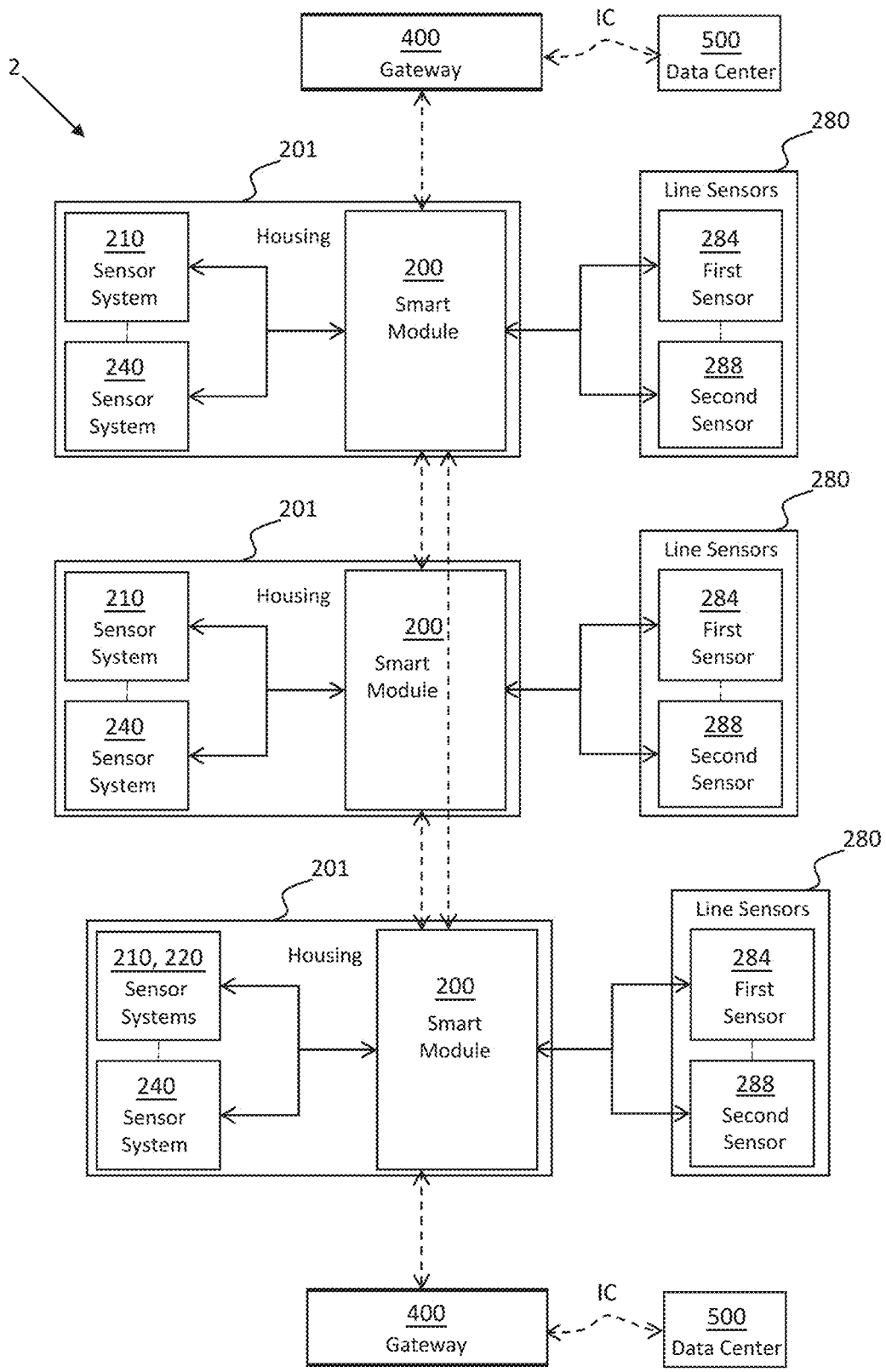
FIG. 5 shows yet another embodiment of the monitoring system in accordance with the invention.

FIG. 4 shows a possible embodiment of the monitoring system 2 in accordance with the invention. FIG. 5 shows yet another embodiment of the monitoring system 2 in accordance with the invention. These figures will be discussed in as far as they differ from the previous figure. These two figures serve to illustrate the enormous amount of design freedom for the monitoring system. In general, it is desired to place as much functionality outside the safety and security distances from the power lines, typically at least 3 meters in accordance with the directive in the EN50110-1 standard for regional power networks. As far as the sensor systems in accordance with the invention are to be placed inside this safety and security distance, they will have to be mounted using Live-line work processes (Norwegian: "Arbeid Under Spenning (AUS)") or when the power lines are switched off. In this description the "safety and security distances" are also being referred to with the wording "Live working and Vicinity zones", wherein obviously said zones are defined by the space that is within the respective safety and security distances from the power lines.

In FIG. 4 the earlier discussed functionality has been mounted inside or on the respective housings 201 of the smart modules 200, that is both the earlier-mentioned communication functionality as well as the sensor systems 210, 220, 230, 240 and the weather station 290. In variants of this embodiment some or all of the sensor systems 210, 220, 230, 240 and weather station 290 may be placed outside of the respective housing 201 of the respective smart module 200. And this may also be different for different mast constructions 100, 100-1, 100-2, 100-3 (FIG. 1).

In FIG. 5 part of the functionality has been mounted inside or on the line sensors 280, while other functionality has been mounted inside or on the respective housing 201 of the smart modules 200 as in FIG. 4. The line sensors 280 may comprise more than one sensor 284, 288 as illustrated in the figure. The first sensor 284 may comprise a transient sensor, such as a vibration sensor, and the second sensor 288 a current sensor or a sparkover sensor. The line sensor 280 may also comprise more than two sensors. Many variations in the embodiment of FIG. 5 are possible, similar to those mentioned for FIG. 4.

Figure 6:
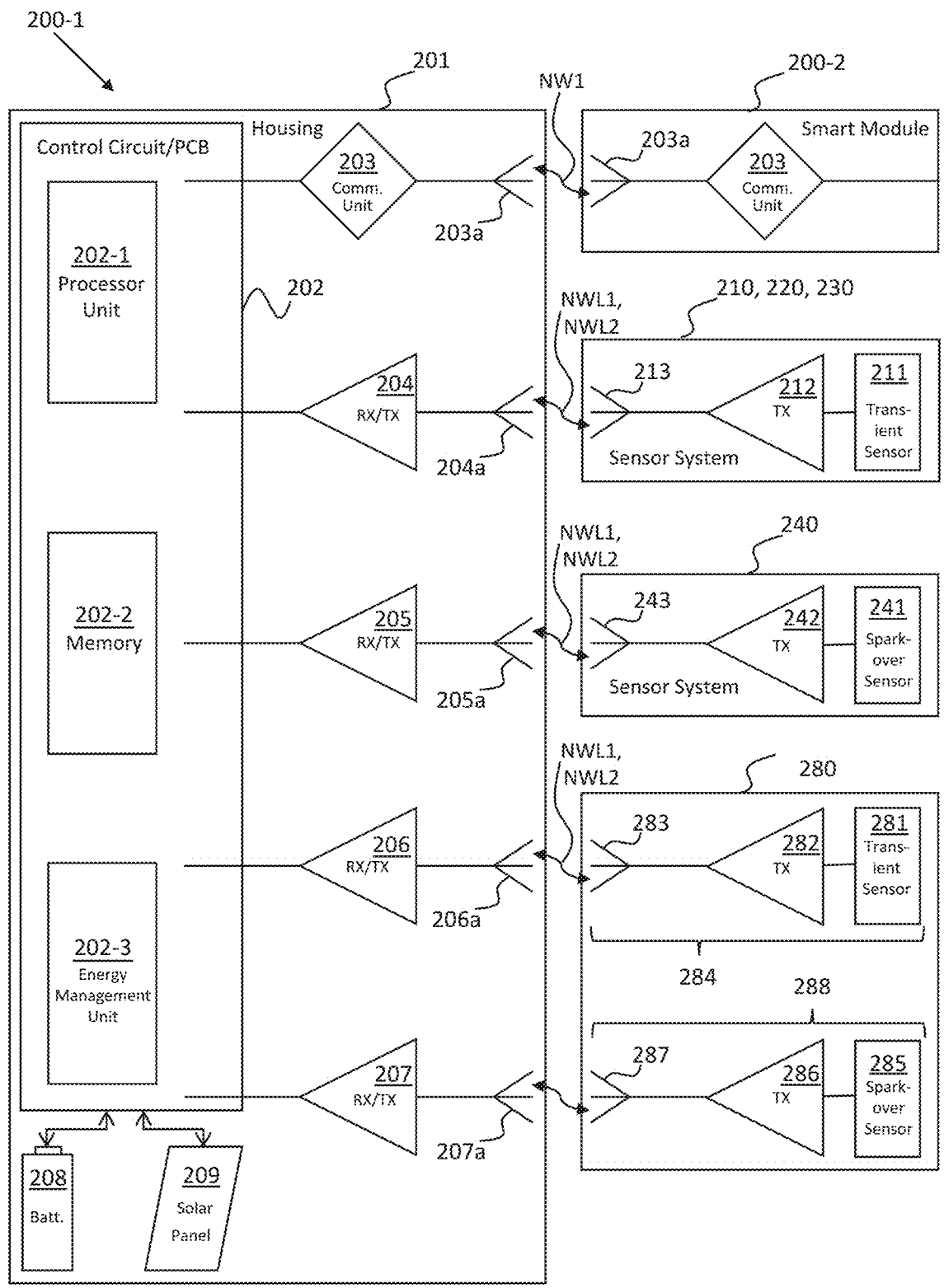
FIG. 6 illustrates further details of an embodiment of the monitoring system of FIGS. 1-5.

FIG. 6 illustrates further details of an embodiment of the monitoring system of FIGS. 1 to 5. The amount of variations in the implementation and configuration are virtually endless, yet an example embodiment is described here in order to help the person skilled in the art to build the invention based upon this specification. The figure only illustrates one smart module 200-1 in detail and another smart module 200-2 in part.

Each smart module 200-1 comprises a control circuit/PCB 202 having main components such as a processor unit 202-1, a memory 202-2 and an energy management unit 202-3. The processor unit 202-1 is configured for carrying out calculations and manipulations on the determined quantities and events to extract the relevant information to be transmitted over the main wireless communication network NW1. The PCB 202 is connected to or comprises a communication unit 203 and a respective antenna 203*a*. The same components are illustrated for the other smart module 200-2.

The monitoring system 2 of FIG. 6 further comprises a plurality of transient sensor systems 210, 220, 230 (pressure, tension, vibration). Each such sensor system 210, 220, 230 may comprise a respective transient sensor 211, a respective transmitter and a respective antenna 213 as illustrated. The respective antenna 213 has a counterpart, i.e. another antenna 204*a* at the side of the smart module 200, which is connected to the PCB 202 via a respective receiver/transmitter 204. Said antennas 204*a*, 213 and connected systems are configured to establish the earlier discussed local wireless communication networks NWL1, NWL2.

The monitoring system 2 of FIG. 6 further comprises a sparkover sensor system 240, which comprises a sparkover sensor 241, a respective transmitter 242 and a respective antenna 243 as illustrated. The respective antenna 243 has a counterpart, i.e. another antenna 205*a* at the side of the smart module 200, which is connected to the PCB 202 via a respective receiver/transmitter 205. Said antennas 205*a*, 243 and connected systems are configured to establish the earlier discussed local wireless communication networks NWL1, NWL2.

The monitoring system 2 of FIG. 6 further comprises a line sensor 280, which comprises a transient sensor system 284 comprising a transient sensor 281, a respective transmitter 282 and a respective antenna 283 as illustrated. At the side of the smart module 200 corresponding transmitter 206, 207 and antenna 206*a*, 207*a* configurations are provided. The line sensor 280 further comprises a current sensor/sparkover sensor system 288 comprising a current sensor/sparkover sensor 285, a respective transmitter 286 and a respective antenna 287. Even though said sensors 284, 288 in the line sensor 280 are designed with their own antenna 283, 287 and transmitter 282, 286, it is also possible to make said sensors 284, 288 share their communication systems.

The monitoring system 2 further comprises a solar panel 209 for providing energy to the system 2, and a rechargeable battery or battery pack 208 for providing energy to the system 2 in times where the solar cell panel 209 does not produce any energy.

Even though certain components in FIG. 6 are drawn outside the PCB 202, they may still be implemented on the same PCB. Likewise, certain functionality may be placed inside a housing and other functionality on the outside of the housing, such as the solar panel 209.

The sparkover sensors 241 and 285 in FIG. 6 may themselves comprise further antennas and multiple frequency band reception for sensing sparkover (detecting emitted RF signals).

Figure 7:
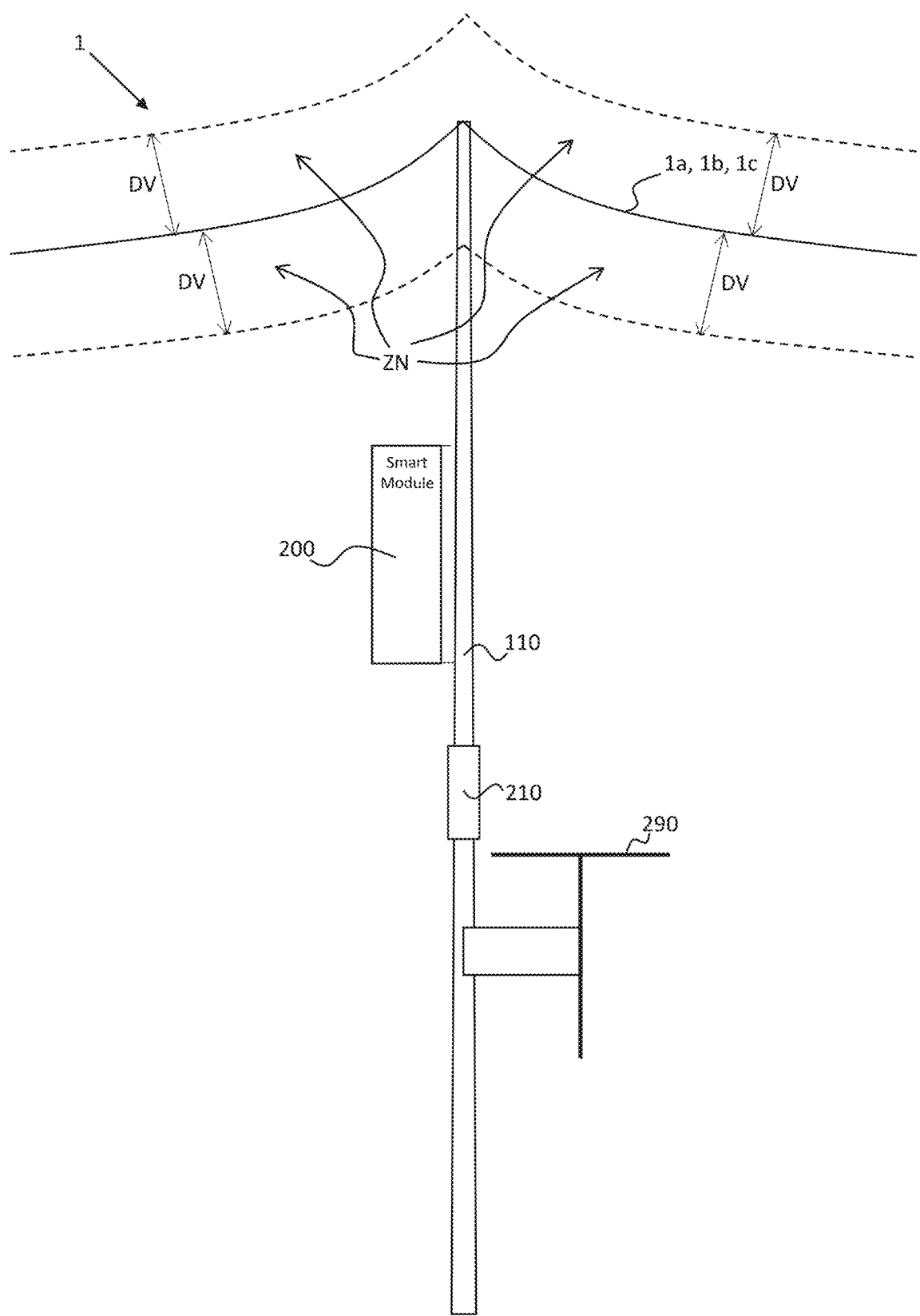
FIG. 7 illustrates what is meant with Live working and Vicinity zones.

FIG. 7 illustrates what is meant with Live working and Vicinity zones. The figure schematically illustrates how the Live working and Vicinity zones as laid out in the EN50110-1 standard for regional power networks are defined. There is defined a safety distance DV from all voltage-carrying components, whereas the respective Live working and vicinity zones ZN are defined as the space within that distance.

The particular embodiments disclosed above are illustrative only, as the invention may be modified and practiced in different but equivalent manners apparent to those skilled in the art having the benefit of the teachings herein. For example, instead of using local wireless communication networks between the smart modules and the sensor systems, some or all of those sensor systems may be connected by wire. Concerning the smart module, some sensor systems may be placed inside and some sensors outside the housing. Some sensor systems may be integrated onto the PCB and some sensor systems may be integrated outside the PCB.

One of the embodiments mentioned in this specification concerns the measuring of power line temperature with thermal imaging camera or infrared long-distance sensors from the "Smart module" (also called "smart node"). This is possible at more than 10 m distance with relatively low-cost sensors and cameras with pixel size small enough to resolve the power line. Example: Field of view 30 degrees with 500 pixels gives 0.06 degrees per pixel, which is 3 mm at 3 m. The lines are 10-35 mm in diameter. Thus, by simply putting a thermal camera on top of the smart module with a field of view that is wide enough, it is possible to monitor the entire construction including isolators, conductors and fasteners. Looking upwards may have its limitations due to ice and snow, but this is possible to solve. In Norway, the sun never reaches zenith and is more than 30 degrees away for most locations, so it is easy to mask.

The person skilled in the art may easily find alternative solutions for tightening, tensioning and mounting parts. The invention covers all these variants as long as they are covered by the independent claim. No limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. The invention may be implemented by means of hardware comprising several distinct elements, and by means of a suitably programmed computer. In the device claims enumerating several means, several of these means may be embodied by one and the same item of hardware.

The invention claimed is:

1. A system for monitoring a power distribution network, wherein the power distribution network comprises a plurality of mast constructions placed on a ground at certain distances from each other and carrying at least one power line mounted to said mast constructions, wherein the system comprises at least two smart modules, each smart module being affixed directly to a respective one of the plurality of mast constructions,
  wherein the at least two smart modules are designed for wireless communication with each other in accordance with a wireless communication protocol for forming a main wireless communication network along the at least one power line,
  wherein the system further comprises at least one sensor system affixed directly to a respective one of said mast constructions, the at least one sensor system being designed for determining at least one quantity or event of the power distribution network and for communicating said at least one quantity or event to a respective smart module, and
  wherein the at least two smart modules are further designed for communicating information associated with said at least one quantity or event along the main wireless communication network of smart modules for being remotely monitored at a data center,
    wherein at least a portion of the information associated with said at least one quantity or event is obtained by processing the determined quantity or event inside one of the at least two smart modules,
      wherein the processing includes data storage, concentration, consolidation, compression, and correlation of all local data from the at least two smart modules to control and optimize traffic in the network to get relevant information to the data center,
  wherein the at least two smart modules are placed outside Live working and Vicinity zones in accordance with the EN50110-1 standard for power networks, and wherein at least one of the at least one sensor system is contained in each smart module itself.

2. The system for monitoring the power distribution network according to claim 1, wherein said smart modules form a wireless mesh network.

3. The system for monitoring the power distribution network according to claim 2, wherein at least one of the at least one sensor system is mounted directly to a first mast construction of the plurality of mast constructions outside a first smart module of the at least two smart modules.

4. The system for monitoring the power distribution network according to claim 2, wherein said smart modules are placed at such locations and at such distances relative to each other that at least a subset of said smart modules are capable of skipping one or more smart modules to communicate directly with a first-following node thereafter.

5. The system for monitoring the power distribution network according to claim 4, wherein at least one of the at least one sensor system is mounted directly to a first mast construction of the plurality of mast constructions outside a first smart module of the at least two smart modules.

6. The system for monitoring the power distribution network according to claim 1, wherein the at least one sensor system is designed for sensing at least acceleration and/or vibration of the respective mast construction to which it is mounted.

7. The system for monitoring the power distribution network according to claim 6, wherein at least one of the at least one sensor system is mounted directly to a first mast construction of the plurality of mast constructions outside a first smart module of the at least two smart modules.

8. The system for monitoring the power distribution network according to claim 1, wherein at least one of the at least one sensor system is mounted directly to a first mast construction of the plurality of mast constructions outside a first smart module of the at least two smart modules.

9. The system for monitoring the power distribution network according to claim 8, wherein the at least one sensor system is designed
  i) for measuring tension and/or compression of a part of the first mast construction to which it is mounted and/or
  ii) for sensing at least acceleration and/or vibration and/or inclination of the first mast construction to which it is mounted and/or
  iii) for sensing presence and location of sparkover between power lines and/or between a respective power line and ground, and/or for
  iv) sensing or measuring temperature of a power line of the at least one power line and/or for measuring down-conductor current.

10. The system for monitoring the power distribution network according to claim 8, wherein the at least one sensor system is designed for measuring tension and/or compression of a part of the first mast construction to which it is mounted.

11. The system for monitoring the power distribution network according to claim 1, wherein each pair of a respective sensor system and a respective smart module is designed for wireless communication with each other using a further wireless communication protocol for forming a local wireless communication network in between said sensor system and said smart module forming the pair, wherein the local wireless communication network is different from the main wireless communication network.

12. The system for monitoring the power distribution network according to claim 1, wherein the at least one sensor system comprises a camera for visual or thermal inspection of the power distribution network including the mast construction to which the at least one sensor system is affixed and the at least one power line, and wherein the smart modules are designed for communicating visual inspection data along the main wireless communication network.

13. The system for monitoring the power distribution network according to claim 1, wherein the at least one sensor system comprises a sparkover sensor which is designed for sensing sparkover between power lines or between a respective power line and ground and determining a distance between said sparkover sensor and a sparkover location on the at least one power line.

14. The system for monitoring the power distribution network according to claim 1, wherein the at least one sensor system comprises at least one current sensor for sensing a current through the at least one power line.

15. The system for monitoring the power distribution network according to claim 1, further comprising at least one line sensor mounted to the at least one power line, wherein said line sensor and a respective smart module of the at least two smart modules are designed for wireless communication with each other using a further wireless communication protocol for forming a further local wireless communication network in between them, wherein the further local wireless communication network is different from the main wireless communication network.

16. The system for monitoring the power distribution network according to claim 15, wherein the at least one line sensor is designed for sensing at least one of: vibration of a respective power line, inclination of a power line of the at least one power line, compression and/or contraction of a power line of the at least one power line, power line temperature, voltage from phase to ground, the current running through a power line of the at least one power line and presence and location of sparkover between power lines and/or between a respective power line and ground.

17. The system for monitoring the power distribution network according to claim 1, wherein at least one of the mast constructions is provided with a weather station for determining the weather, wherein said weather station is coupled to a respective smart module, and wherein said smart modules are designed for communicating weather data along the main wireless communication network.

18. The system for monitoring the power distribution network according to claim 1, wherein the at least one sensor system comprises a thermal imaging camera for measuring power line temperature, wherein the thermal imaging camera is mounted to a top of a first smart module of the at least two smart modules such that a field of view of the thermal imaging camera includes a portion of each of the at least one power line, and an isolator that couples each of the at least one power line to a respective mast construction of the plurality of mast constructions.

19. A method of building a system for monitoring a power distribution network according to claim 1, wherein the method comprises steps of:
affixing said at least two smart modules to their respective mast constructions outside the Live working and Vicinity zones in accordance with the EN50110-1 standard for power networks;
affixing a further one of the at least one sensor system directly to a respective mast construction, outside said zones in accordance with said standard, as far as these are located outside a smart module of the at least two smart modules;
mounting a respective camera to a mast construction of the plurality of mast constructions, outside said Live working and Vicinity zones;
mounting at least one line sensor to the at least one power line.

20. A method of performing operations on a system for monitoring a power distribution network according to claim 1, wherein the method comprises at least one of:
operating a respective smart module at respective mast constructions outside the Live working and Vicinity zones in accordance with the EN50110-1 standard for power networks;
performing maintenance on a respective smart module located outside the Live working and Vicinity zones in accordance with the EN50110-1 standard for power networks, and
removing a respective smart module located outside the Live working and Vicinity zones in accordance with the EN50110-1 standard for power networks.

* * * * *